US009817887B2

(12) United States Patent
Gaydaenko et al.

(10) Patent No.: US 9,817,887 B2
(45) Date of Patent: Nov. 14, 2017

(54) UNIVERSAL TEXT REPRESENTATION WITH IMPORT/EXPORT SUPPORT FOR VARIOUS DOCUMENT FORMATS

(71) Applicant: ABBYY InfoPoisk LLC, Moscow (RU)

(72) Inventors: Sergey Gaydaenko, Moscow Region (RU); Anton Krivenko, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 412 days.

(21) Appl. No.: 14/572,098

(22) Filed: Dec. 16, 2014

(65) Prior Publication Data

US 2015/0199422 A1 Jul. 16, 2015

(30) Foreign Application Priority Data

Jan. 15, 2014 (RU) ................................ 2014101123

(51) Int. Cl.
*G06F 17/30* (2006.01)
*G06F 17/22* (2006.01)

(52) U.S. Cl.
CPC .... *G06F 17/30625* (2013.01); *G06F 17/2264* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,629,846 | A | 5/1997 | Crapo | |
| 6,377,953 | B1 * | 4/2002 | Gawlick | G06F 17/30569 707/701 |
| 6,558,431 | B1 * | 5/2003 | Lynch | G06F 17/3089 707/E17.116 |
| 6,812,941 | B1 | 11/2004 | Brown et al. | |
| 2003/0083860 | A1 | 5/2003 | Abir | |
| 2003/0145277 | A1 * | 7/2003 | Neal | G06F 17/30994 715/273 |
| 2004/0133848 | A1 | 7/2004 | Hunt et al. | |
| 2009/0055755 | A1 * | 2/2009 | Hicks | G06F 17/3089 715/760 |
| 2009/0319946 | A1 * | 12/2009 | Boyer | G06F 17/30011 715/810 |
| 2010/0185689 | A1 * | 7/2010 | Hu | G06F 17/2775 707/803 |

FOREIGN PATENT DOCUMENTS

EP 1132833 A2 9/2001

* cited by examiner

*Primary Examiner* — Etienne Leroux
(74) *Attorney, Agent, or Firm* — Lowenstein Sandler LLP

(57) ABSTRACT

Disclosed are systems, computer-readable mediums, and methods for representing text. A document that includes text is received in a first format. A universal text representation of the document is created using a first filter associated with the first format. The universal text representation presents the text and supported non-text data and preserves unsupported data with binding to supported data. The universal text representation is modified based upon input from a user using a program in a what you see is what you get (WYSIWYG) mode. The user can see a location of where the supported data and unsupported data are kept. The modified universal text representation is exported using a second filter associated with a second format. The supported and unsupported non-text data are exported.

19 Claims, 12 Drawing Sheets

```
<html>
<body>

    <img src="https://www.w3.org//Icons/w3c_home" />

    <h1>XML 1.1 Second Edition Specification Errata</h1>

    <h2>Abstract</h2>

    <p>This document records all known errors in the Second Edition of the Extensible Markup
       Language (XML) 1.1 Specification; for updates see the latest version.</p>

    <p>The errata are numbered, classified as Substantive or Editorial, and listed in reverse
       chronological order of their date of publication in each category. Changes to the
       text of the spec are indicated thus: <span style="text-decoration: line-through">deleted
       text</span>, <span style="background-color: Lime">new text</span>, <span style="background-colo
       modified text</span>. Substantive corrections are proposed by the <a href="http://www.w3.org/XM
       XML Core Working Group</a>, which has consensus that they are appropriate;
       they are not to be considered normative until approved by a <a href="http://www.w3.org/2004/02/
       Call for Review of Proposed Corrections</a> or a <a href="http://www.w3.org/2004/02/Process-200
       Call for Review of an Edited Recommendation</a>.</p>

    <p>Please email error reports to <a href="mailto:xml-editor@w3.org">xml-editor@w3.org</a>.</p>
</body>
</html>
```

| | | |
|---|---|---|
| The | [0; 3) | |
| errata | [4; 10) | ошибки |
| are | [11; 14) | |
| numbered | [15; 20) | нумеруются |
| classified | [21; 31) | классифицируются |
| as | [32; 34) | как |
| Substantive | [34; 45) | существенные |
| or | [46; 48) | или |
| Editorial | [49; 58) | редакторские |
| and | [59; 65) | и |
| listed | [66; 72) | перечисляются |
| in | [73; 75) | в |
| reverse | [76; 83) | обратном |
| chronological | [84; 97) | хронологическом |
| order | [98; 103) | порядке |
| of | [104; 106) | согласно |
| their | [107; 112) | |
| date | [113; 117) | дате |
| of | [118; 120) | |
| publication | [121; 132) | публикации |
| in | [133; 135) | в |
| each | [136; 140) | каждой |
| category | [141; 149) | категории |

```
<html>
<body>
    <img src="http://www.w3.org//Icons/w3c_home" />

    <h1>Ошибки второго издания спецификации XML 1.1</h1>

    <h2>Резюме</h2>

    <p>С помощью этого документа записываются все известные ошибки во втором издании спецификации
      Расширяемого языка разметки (XML) 1.1, для обновлений см. последнюю версию.</p>

    <p>Ошибки пронумерованы, классифицированы как существенные или редакторские и перечислены
      в обратном хронологическом порядке согласно дате публикации в каждой категории.
      Изменения текста спецификации указаны следующим образом: <span style="text-decoration: line-through">
      удалённый текст</span>, <span style="background-color: Lime">новый текст</span>,
      <span style="background-color: yellow"> модифицированный текст</span>. Существенные
      поправки предложены<a href="http://www.w3.org/XML/Core/"> Основной рабочей группой XML</a>,
      которая имеет соглашение, что они являются подходящими; они не должны считаться
      нормативными, пока не будут одобрены <a href="http://www.w3.org/2004/02/Process-20040205/tr.html#cfr-corrections">
      Созывом по рассмотрению предложенных поправок</a> или <a href="http://www.w3.org/2004/02/Process-20040205/tr.html#cfr-edited">
      Созывом по рассмотрению отредактированных рекомендаций</a>.</p>

    <p>Пожалуйста, отправляйте отчёты об ошибках на электронный адрес
      <a href="mailto:xml-editor@w3.org">xml-editor@w3.org</a>.</p>

</body>
</html>
```

Figure 9

UNIVERSAL TEXT REPRESENTATION WITH IMPORT/EXPORT SUPPORT FOR VARIOUS DOCUMENT FORMATS

CROSS REFERENCE TO RELATED APPLICATIONS

This application claims the benefit of priority to Russian Patent Application No. 2014101123, filed Jan. 15, 2014; the disclosure of which is incorporated herein by reference.

BACKGROUND

There are two known general approaches for working with documents in different formats during the process of developing Natural Language Processing (NLP) systems, for example, in machine translation. The first approach is based on integration with applications that use various formats. In this approach, external programs (such as Internet Explorer and Microsoft Word) and their API (application programming interfaces), that include a collection of standard procedures (functions, methods), are used to develop application software to work with data in the specific formats. The API determines a certain level of abstraction that allows working with a family of related formats supported by a single application. In this case, a special application or library can be used to work with the specific format. For example, if it is necessary to support the *.DOC format, one can use Microsoft Word™. Microsoft Word™ provides an API so that software can read and modify Microsoft Word™ documents. However, that does not allow source texts to be transferred from the format of one editor to the format of another.

This first approach has at least the following shortcomings:

- it is impossible to use it for every format and application;
- it requires an outside native application;
- processing in automated mode, such as on a server, is made more difficult or impossible;
- adding additional functions to the editor, such as dynamic highlighting of variant translations in a machine translation system, is made more difficult or impossible; and
- conversion into a different format is impossible or limited to supported different formats.

Another limitation of the first approach is that if the source format, such as .PDF, cannot be edited, the user or the system cannot add or change anything.

An outside application can be avoided, if one's own library is able to work with a specific format. The specification of the format, however, must be accessible. The task of supporting the capability of editing while retaining the data is very labor-intensive. A general shortcoming of this approach is that an individual solution is needed for each format. That is inconvenient, both for the developer and for the end user.

Another approach is to represent source documents as text with tags. An example format that uses this approach is the XLIFF format. This approach is also used in developing NLP products. Using this approach, documents of various formats are transformed into a global representation as text annotated with tags. The composition and content of the tags are determined by the source format of the document. The tags store data needed to recover the document. The tags may be formatting or structured data. Some of the tags cannot be changed, but some tags can be edited together with the text that corresponds to the tag. Modification is usually done in semi-automatic mode. The user manually tracks and corrects the text that contains tags. The advantage over the previous approach is that the solution is uniform for all formats. One shortcoming is that the document-editing capabilities are severely limited. Automatic modification is cumbersome and correcting text by hand is inconvenient.

An example of such a format is XLIFF (https://www.oasis-open.org/committees/xliff/faq.php#WhatIsXLIFF). XLIFF is an open standard (utilizing XML) for describing documents. The problem of converting from one particular format to another particular format, however, is not solved solely by the XLIFF standard. This standard also does not provide a capability of displaying and editing a document in What You See Is What You Get (WYSIWYG) mode. So the individual or general shortcomings of the second approach are at least:

- there is an insufficient selection of editing tools, lack of WYSIWYG;
- it can be impossible to convert to another format; and
- it is well suited to tag-based formats such as HTML or XML, but not very useful for binary formats such as DOC.

Text editors such as Microsoft Office™ or OpenOffice™ could be used to open and store files in various formats.

Document editing application supports can support a specific type of document. For example, if the "type" is "text document," then the formats Microsoft Word™, a rich text editor format, and OpenDocument Text are possible. These formats are supported by a variety of applications, such as, Microsoft Word™, OpenOffice™, and AbiWord™. Some applications are limited to opening only particular formats of documents. For example, it is impossible to open presentation (PowerPoint) files in Microsoft Word™. Even if a document of the same type is opened in different editing applications, the document may be displayed differently. For example, formatting and data elements may be partially lost or distorted.

BRIEF DESCRIPTION OF THE DRAWINGS

FIG. 3C illustrates source HTML code that corresponds to this text.

FIG. 6 illustrates an example of a text→text translation table in accordance with one embodiment.

FIG. 9 shows an example of HTML code for the translation placed in FIG. 9 in accordance with one embodiment.

SUMMARY

Figure 1:
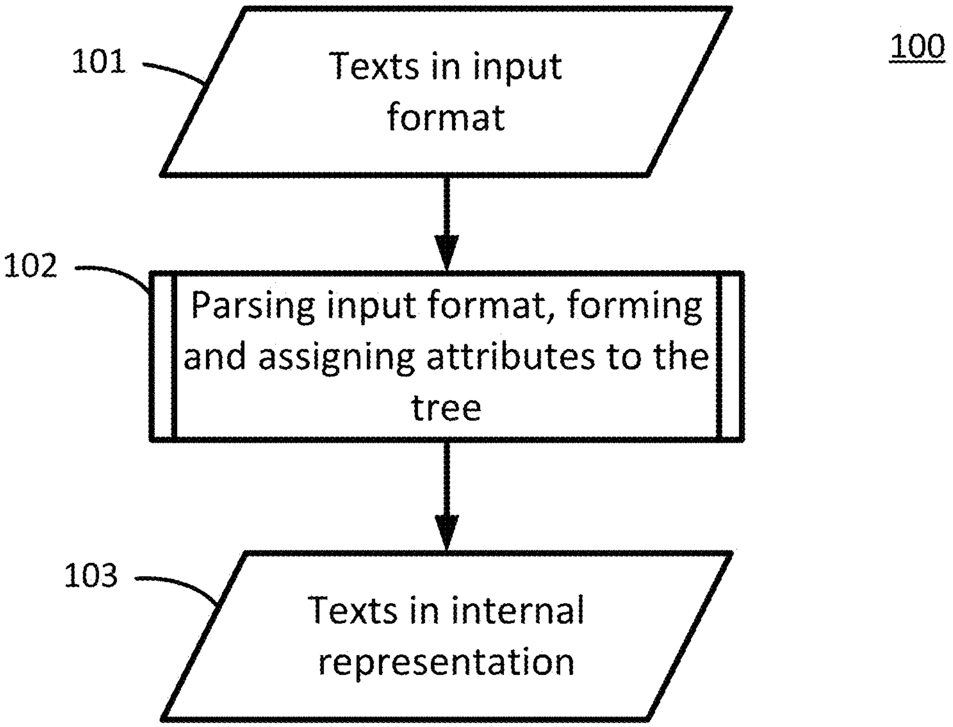
FIG. 1 illustrates a flow diagram of operations for obtaining a universal representation for texts in any format.

Disclosed are systems, computer-readable mediums, and methods for representing text. A document that includes text is received in a first format. A universal text representation of the document is created using a first filter associated with the first format. The universal text representation presents the text and supported non-text data and preserves unsupported data with binding to supported data. The universal text representation is modified based upon input from a user using a program in a what you see is what you get (WYSIWYG) mode. The user can see a location of where the supported data and unsupported data are kept. The modified universal text representation is exported using a second filter associated with a second format. The supported and unsupported non-text data are exported.

DETAILED DESCRIPTION

Described herein are systems and methods for a universal representation of documents that is suited for use by various editors and application software, particularly if the representation needs to be changed, such as if it needs to be translated into another language. The documents, such as files in a storage device, may comprise text data and also non-text data. In certain embodiments, a universal representation is accomplished by producing and supporting an appropriate representation of a text data and non-text data for all formats that maintains the original data when edited but eliminates some or all of the shortcomings indicated above. These embodiments can be a text subsystem—a tool that is designed to store text data. A universal representation is suited for storage, editing and restoration of data from any text format, formatting text or any attributes that characterize the text.

The text data can represent text documents in various formats. A format is a binary representation of text data and non-text data. For instance, html, docx, xls are examples of binary formats. Unusual, but additional possible examples—executables (exe) and resource (rc) files. An editor allows these documents to be edited and exported in the original format while preserving all the data. Automated editing is possible, as is manual editing in a WYSIWYG editor. Embodiments allow analysis and modification of documents in various formats without loss of data. This is a problem faced by machine translation programs.

In one embodiment, a text document in a particular format can be transformed into a universal text representation of the document. The universal text representation is a model of data, the model determining a way of document representation including its text data and non-text data, and also methods of editing and modifying the data. The mentioned text subsystem and its interface, ITextDocument, is an example of embodiment of such a model. In this embodiment the text (text data) is considered as a simple line of symbols. A non-text data is other data which can be related to a text. In another case, non-text data does not relate to a text. Examples of non-text data are formatting, structure, pictures, etc. In case of executable files a code is the non-text data. The non-text data may be supported by the text subsystem if they are defined in the universal text representation. For example, base properties of formatting, styles, tables, lists, hyperlinks in text, etc., are supported by the text subsystem. Unsupported data is data which is not defined in the universal text representation, for example, more complicated properties of formatting (for example, a type of underlining), updated fields, spreadsheet formulae, etc.

Filters can be used to transform a source document into the universal representation of the text document. A filter of a format is a tool of transforming a document in the format into the universal representation of the document and vice-versa. For example, a filter can parse through the source document and create corresponding elements of the universal representation of the text document. In addition, filters can translate the universal representation into different formats. Accordingly, supporting a new file format can be accomplished by the creation of a filter supporting the new file format. External applications such as format analyzers can be used on the universal representation of the text document. In one embodiment, the document can be structured as a tree. Elements in the universal representation of the text document can include elements and corresponding attributes. Example elements can include:

structure—tables, lists, paragraphs;

formatting—paragraphs, tables, symbols, support for hierarchies of styles; and text objects—hyperlinks, bookmarks, pictures.

To support all the data in the source document, data is mapped to the corresponding elements of the universal representation of the text document. The universal representation can include standard elements that all filters support. For data for which no unique correspondence with the standard elements and attributes of the universal representation can be established, arbitrary attributes can be used. These attributes store arbitrary data and are associated with suitable standard elements such as the entire document, structural elements, the text range, or the style. The filter of a specific format can determine the arbitrary attributes.

When a document is edited, both the editor and a translation program can edit and interact with the standard elements of the universal representation. The non-standard attributes remain invisible. When only standard elements are edited, the integrity of the document is supported automatically. During export to the source format, using the filter corresponding to the source format, all of the data, both standard and non-standard, will be recognized and restored by the filter.

During editing, questions can arise as to how to deal with an association of a given attribute. For example, during translation of a phrase to which an attribute has been assigned, the phrase may be broken down into two phrases based on different spots in the text. When this happens, the attribute can be associated with both ranges or only with the first to indicate how the phrase can be broken down into two phrases. The desired behavior depends on the data and the format that an attribute represents. Similar behavior can occur for attributes.

An advantage of the disclosed embodiments is that a common editor can be used to view and edit all supported formats. In addition, the common editor can include WYSIWYG support. Converting between different supported formats, using a standard set of elements and attributes, can also be accomplished.

In various embodiments, a document is translated from a source format into a universal representation. Text documents can be stored in various different formats, such as HTML, Microsoft Word™, PowerPoint™, InDesign™, etc. In accordance with various embodiments, text documents stored in a variety of source formats can be converted into the universal representation. The universal representation of a document includes the text information, the formatting and data structures: lists, tables, styles, illustrations, etc. These elements within the universal representation, e.g., text, formatting, structures, can be modified. The modification can be done automatically by software or by a user with a WYSIWYG editor.

After the universal representation is modified, it may be exported into the source format or into other formats. Due to the wide variety of source formats, a source document can include data that is not directly supported within an editor or within defined elements of the universal representation. For example, extra formatting properties such as complex underlining, tables and lists, structure of headings, macros, complex text boxes, metadata, etc., may not be supported. To recreate the source document from the universal representation, this data can be retained within the universal representation. For example, when a document is modified and converted, all the additional format data, such as all the links to attributes of a source element, are transferred to the corresponding element in the modified document.

If the universal representation of a document is not modified, the source document can be recreated from the universal representation. In one embodiment, the recreated document looks exactly like the source document. If the document was modified and recreated from the universal representation, the recreated document looks as if it were modified by its "native" application. In addition, the universal representation may be exported into any supported format, such as universal text formats HTML or RTF. Usually, however, additional data not supported by a specific format will be lost. For example, if a representation does not support the complex lists of Microsoft Word™, the complex lists will not be properly displayed in such a representation. And vice versa, lists created in an outside editor will look different in Microsoft Word™. As additional examples double underlining can become single underlining; instead of a current date field, text of a date at the time the source document was saved is used; and the keywords, footnotes and comments can be discarded. However, if the universal representation is exported to the original source format, these attributes may be saved during import and then restored during export to the same format.

Various embodiments include at least the following features:

1. A universal text document processor.
2. Programmatically accessible universal representation.
3. A WYSIWYG editor
4. The document may be modified while retaining any unsupported data.
5. Conversion of the universal representation into various different formats.

While unsupported data can be retained in the universal representation, converting the document into formats different from the source format can result in data loss in the converted document. For example, it is impossible to save source RTF in HTML without losing part of the structure and formatting. The above features can be accomplished without requiring access to the source application in which the document was created.

The universal representation can be used in a machine translation system. Other systems that require processing and modification of documents into documents in different formats can use the universal representation. For example, a check that highlights and corrects mistakes; or
prevention of data loss.

Other uses can include:

import, search and comparison of documents;
only export, generation of reports;
examination/editing programs; and
format conversion.

In one embodiment, the universal representation is close to a generally accepted one, such as the Document Object Model (DOM). However, in addition to the standard elements and attributes (supported by text representation, editor and "universal" format exporters), the universal representation can contain elements and attributes specific to a particular format. Such data associated with a specific format are usually "recognized" only by programs that export to that specific format. In most other cases, this data is usually irretrievably lost when converted into a format different than the original format.

The elements and attributes specific to a particular format are associated with corresponding standard elements of the document in the universal representation. After modification of the universal representation, the data and the attributes remain associated with the corresponding elements of the document, even if the latter were replaced or modified.

Elements in the universal representation can have behavior associated with the elements. When text is modified, various elements associated with the modified text can have different behaviors. How the behaviors of these elements are to be processed must be resolved. For example, a certain fragment of text (a text range) is associated with a certain element such as a hyperlink. After translation, the fragment can be broken into two different parts. Should the hyperlink element remain associated with a single uninterrupted fragment or should it create a duplicate? For example, bookmarks are unique but hyperlinks are not. Consequently, a hyperlink may be duplicated but bookmarks cannot. As another example, a text range can be cut and pasted into a window in another document. The elements associated with the pasted text can also be copied or not copied. For example, copying elements associated with a drawing is possible but elements associated with scripts do not need to be copied. Scripts are normally associated with a specific document context and therefore do not need to be copied for different document.

Elements within the universal representation can be marked "read only" or have their modification limited. This can be useful in working with certain specific formats. For example, if an Excel™ worksheet is being worked on, the content of the table is in a single table (all the text has to be in the single table). The user may edit the text cells but, the universal representation can indicate that number-type cells and the table cannot be modified. An editor of the universal representation can then disallow any modification to these elements.

In some embodiments, an identifier identifying a location of an element in the source document can be saved. The identifier can be stored as a specific attribute associated with the format of the element. For example, a text range element can have an identifier that identifies the location of a text range within the source document. The text range element can include the actual data of the text range. In another implementation, the text range element does not include the actual data of the text range. In this implementation, the data from the source document can be stored in a data element with an associated format. By using the identifier of the text range, the data of the text range can be retrieved from the source document data element. For example, when working with a PowerPoint™ presentation, there is no need to import the entire complex structure of a slide. Rather the text portion and the location of the text can be extracted. This data can then be used to return the text to exactly the location indicated during the export process after processing or modification.

Filters that extract the data can be implemented to support the majority of known formats, including Microsoft Office™ (both binary and XML-based), OpenOffice™, Adobe InDesign™, FrameMaker™, HTML, RTF, and others. Support for new formats can be added. In addition, support for new properties in existing formats (such as headers/footers or text boxes) can be added.

In various embodiments, a text subsystem stores documents in a universal representation that is suited for storage. In addition, the text subsystem can create documents in various formats using the universal representation. An editor for formatting and editing the universal representation can also be part of the text subsystem.

FIG. 1 shows a flow diagram for operations (100) for producing a universal representation for texts in an arbitrary format (101). First the source format is broken down into a block tree (102) is formed. For example, level 1, level 2, etc., headings are found in the text. Chapters, paragraphs, footnotes and comments, links, cutaways, drawings, tables, lists, etc., can be extracted. Higher-level and lower-level keywords, page numbering and other features can also be extracted. The entire text structure is organized into a text tree. As a specific example, an HTML filter can create a node of a tree on one or more HTML tags. For example, each HTML tag can be used to create a node of the tree. As another example, word processing documents can be divided into sections, paragraphs, and tables. In yet another example, slides from a presentation document can be used as the nodes of the first level of the tree. The nodes beneath the first level of nodes can include text or a text box (may contain one or more paragraph) from the slides. The tree can include various types of nodes, such as, but not limited to a root node of a text flow, a table, a cell, a list, an element of a list, a node in generic form (block of text), etc.

A text tree is a block tree. A block is a unit of the logical structure of a document. For example, a paragraph or a frame may be a block. In a text subsystem, however, a block is an element that in itself by its size and location specifies its own dimensions and placement within a document as well as the rules under which the text is to be included within the document. For example, a paragraph may be a block. Paragraph blocks can be included within a parent block. A parent block can have attributes that are used in placing of child blocks. For example, a paragraph does not have a fixed size. When displaying the paragraph in an editor, the size and location of the paragraph can be determined by the parent fixed annotation elements. Frames and tables are exemplary fixed annotation elements in the text subsystem. Fixed annotation elements can identify specific regions within a document.

Text system blocks can form a tree that describes the order the text follows within the document and the arrangement of portions of the text in regard to each other.

Figure 3A:
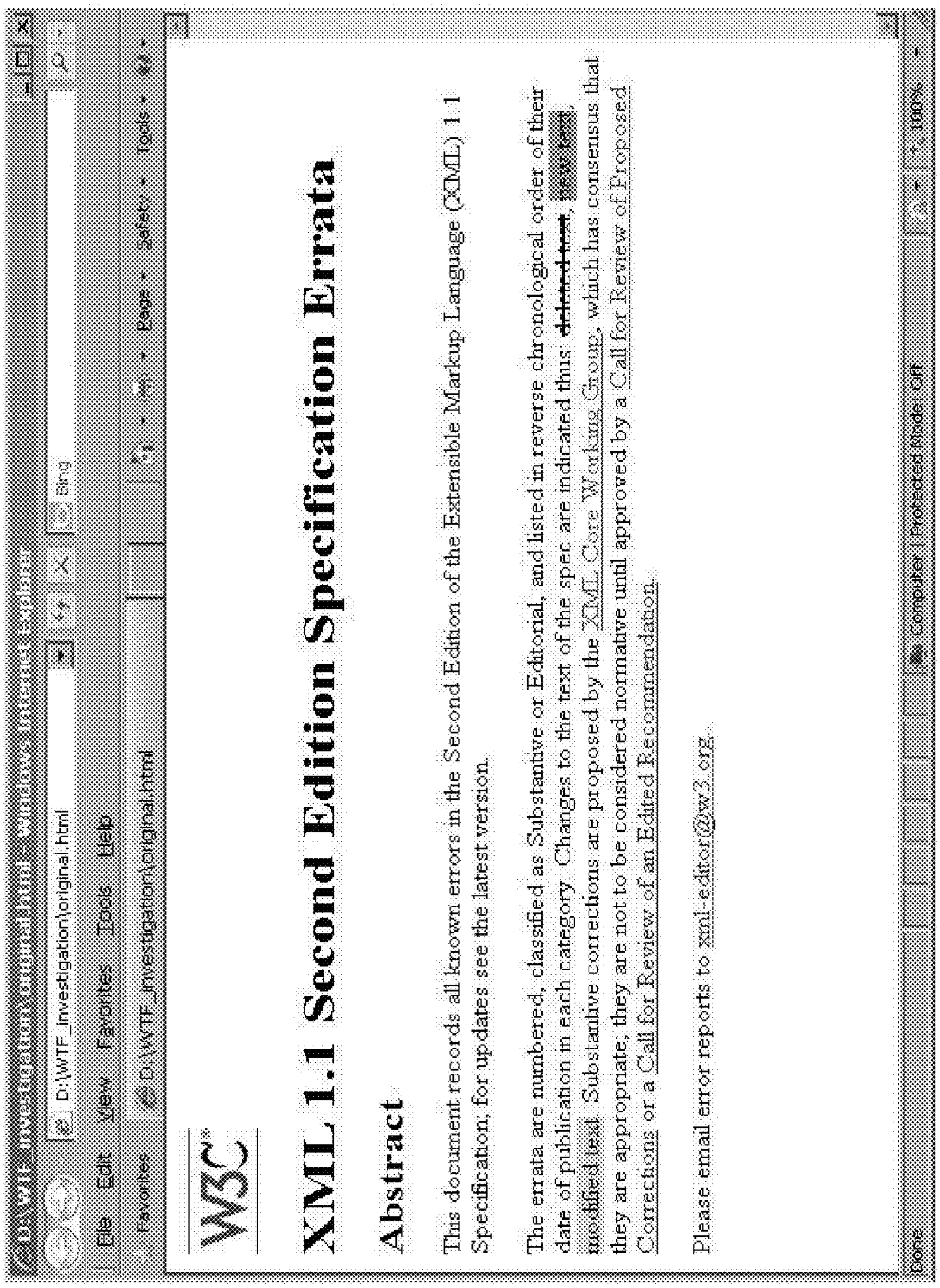
FIG. 3A illustrates an example of source text in a web browser.
Figure 3B:
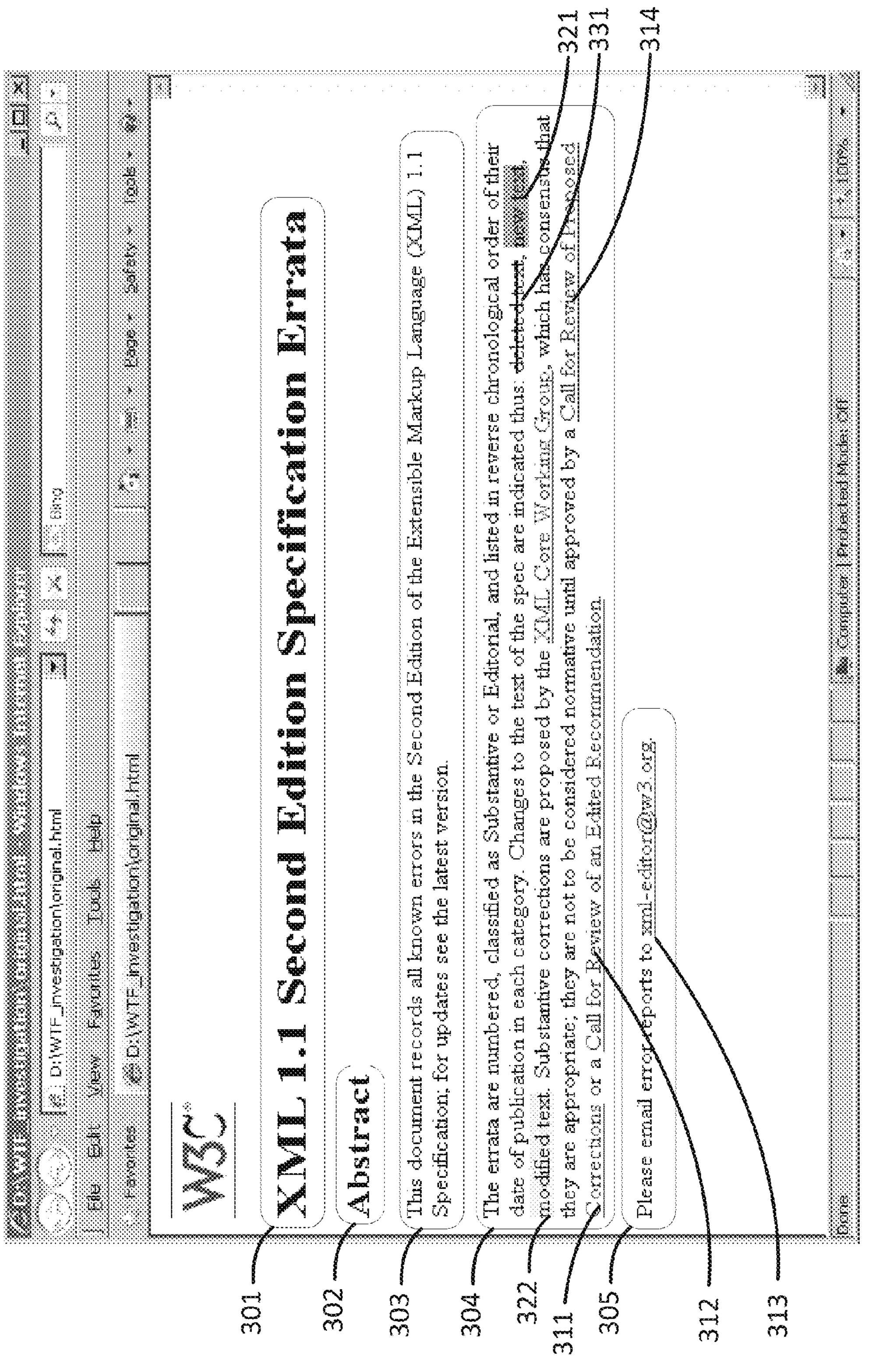
FIG. 3B illustrates objects extracted from the text in accordance with one embodiment.

FIG. 3A illustrates an example of source text in a web browser. FIG. 3B shows objects extracted from the text. This text is broken down into blocks (301, 302, 303, 304 and 305). The extracted objects also include links (311, 312, 313 and 314), highlighted text (321 and 322) and text with strikethrough (331). Other objects that are not shown can be extracted. For example, text that has been bolded, italicized, etc., can be extracted. FIG. 3C shows source HTML code that corresponds to this text.

Any block in the text subsystem can have formatting attributes. In addition, text within a block can have formatting attributes. In one embodiment, the entire document text is placed in the tree, paragraph by paragraph. The text tree can include a text root block that includes the text of the document. This text root block can contain paragraph blocks that include the text of a single paragraph. The text root block, therefore, is considered to contain the text of the entire document through the subordinate paragraphs. As another example, a paragraph block can include sentence, phrase, and/or word blocks. The text of the paragraph block can be retrieved from the text of the sentence, phrase, and/or word blocks.

Figure 4:
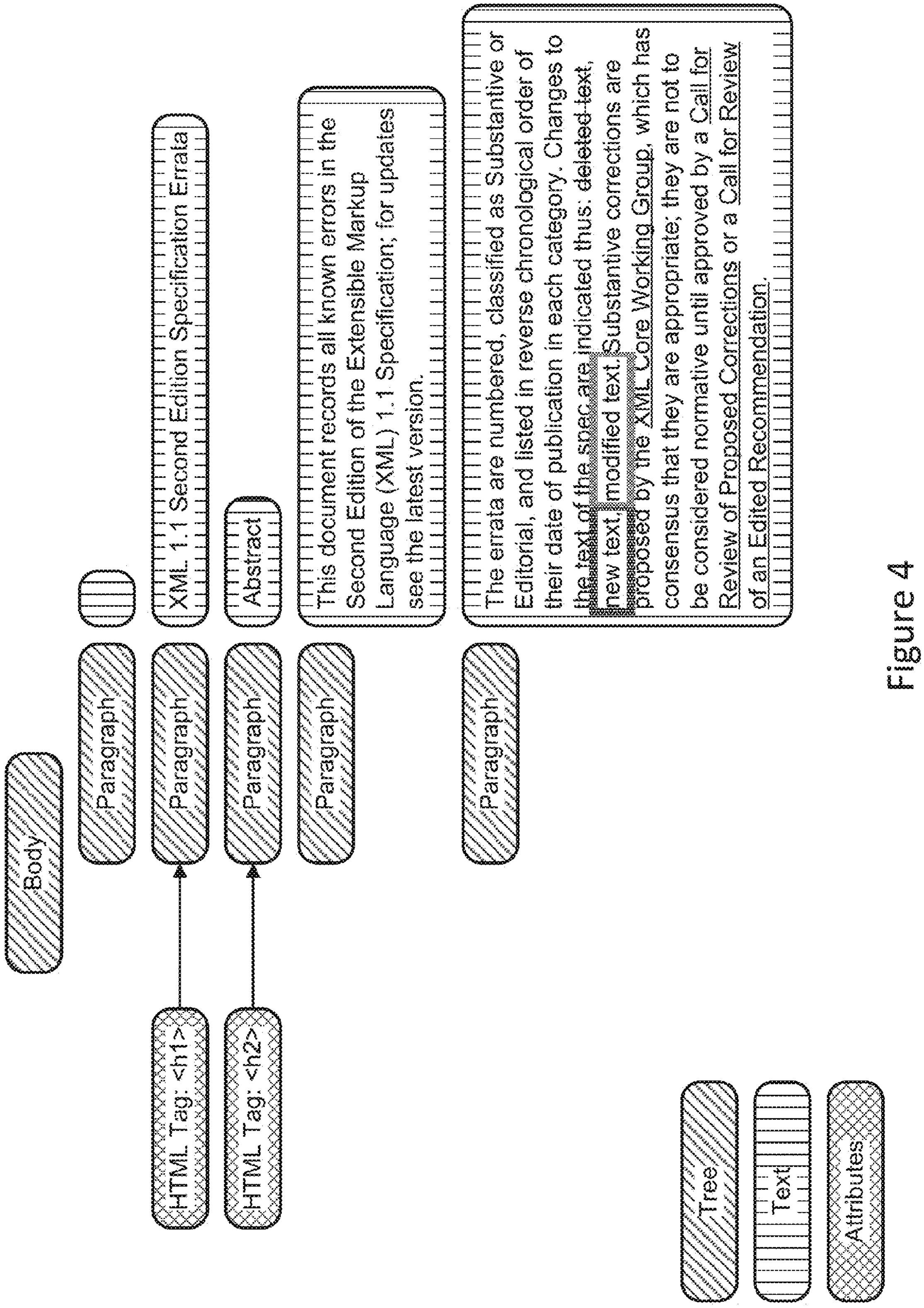
FIG. 4 illustrates a schematic breakdown of the text shown in FIG. 3A into blocks obtained from importing it in accordance with one embodiment.

FIG. 4 shows a schematic breakdown of the text shown in FIG. 3 into blocks obtained from importing the text into an embodiment of the disclosed text system. This schematic representation does not contain formatting properties nor does it associate attributes with text ranges. If the block trees do not include fixed annotation elements, the content of the tree may be written anywhere in a document depending on the destination format. For example, when writing a text document from a source HTML document, the text of paragraphs may not appear exactly the same between the text document and the source HTML document. This is because the HTML viewer will resize a paragraph during the rendering of the HTML based upon the contents of the HTML. In other words, there is no defined position within the rendered HTML document where the text must be located. The same is true for the text version of the HTML document. Accordingly, the HTML document and the text version of the HTML document will contain the same text but may not be formatted exactly the same.

A text tree can have attributes based upon corresponding features within the source document. In addition, blocks can also have attributes based upon the source document. The text tree retains all the information from the source format, such as font, style, thickness and size. Once the construction of the text tree is complete, the text tree represents an internal representation of the source document (103 in FIG. 1).

Figure 5:
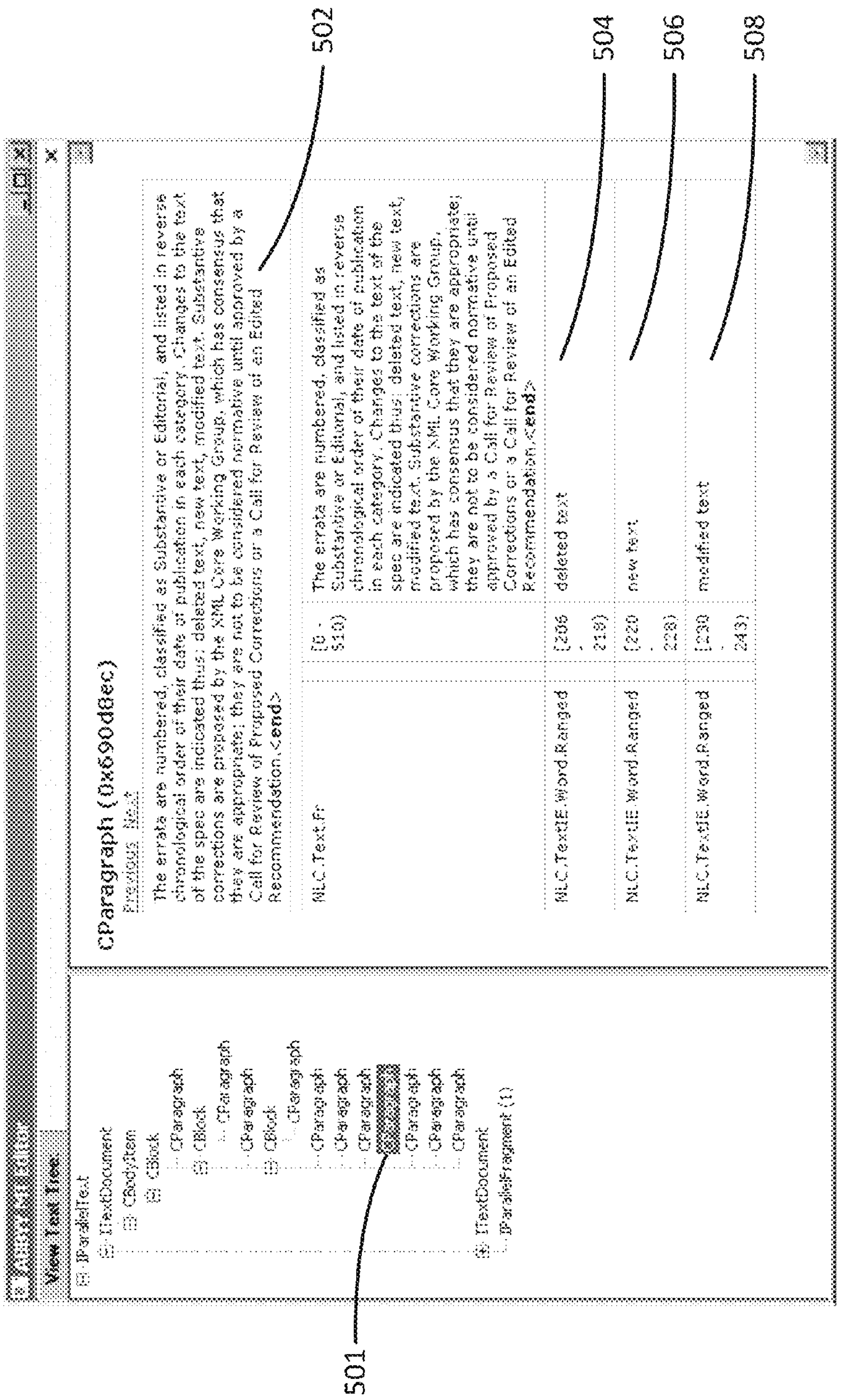
FIG. 5 illustrates the text representation of a document in a debugging window of the text subsystem in accordance with one embodiment.

FIG. 5 illustrates the text representation of a document in a debugging window of the text subsystem in accordance with one embodiment. The extracted paragraph (501) on the left corresponds to a text range that includes text (502) located in the document in a symbol range (0-510). For each piece of text with formatting or attributes differing from the fragment overall, there is a corresponding symbol range. For example, the [206-218] range is indicated for "deleted text" (504), [220-228] for "new text" (506) and [230-243] for "modified text" (508).

The text in the internal representation of the application is a text tree contains substantial differences compared to representation of the text in HTML (XML). The treelike structure of HTML tags for marking a physical structure (layout) and paragraphs are depicted in the text tree, while all the other tags, such as formatting, are depicted in text attributes so that they can be restored after processing is complete. In addition, not all tags of the source documents and not all attributes are shown in the text tree. As embodiments allow for representation of an arbitrary text document in any external format in the form of a text tree of the document, the text tree can include arbitrary properties. These arbitrary properties do not have to be shown in the editor. In addition, users can create arbitrary properties in the text tree. Any application can create, add, and/or read the arbitrary properties. For example, a translator can create arbitrary properties.

A "user objects" mechanism can be used to depict the tags and the attributes of the text in the text tree. The text tree can store all the tags of the imported document as a set of user objects, e.g., attributes. In one embodiment, a tag in an imported document is processed as follows:

1) the tag gives rise to a user object that includes a full description including all attributes of the tag;

2) if there is a corresponding depiction for the tag and its attributes on the text tree (such as in the form of formatting symbols or as entities in the form of pictures, links, etc.), the tag and its attributes are depicted as indicated;

3) the user object is associated with the node engendered by the tag or associated with the text contained in the tag or, if there is no text, on a specially-added symbol; and 4) the tag is analyzed to determine whether there is any ancillary text, such as footnotes, ToolTips, cutouts, etc.).

Formatting is one of the most visible attributes of text. Formatting is a set of attributes that provide the special features for depicting a text symbol (bold, italic, etc.) and a mask that provides the attributes indicated in the formatting. A style is a named formatting that has a number of additional properties. The properties of a style can be based upon ancestors of the style. The full formatting of a style is the sum of the formats of the style and all its ancestors and has a full mask for the attributes. When the formats are consolidated in a style, the subordinate attributes have priority over the parent ones.

In addition to a symbol, the formatting and/or style may be associated with any node on the text tree. The formatting plus the style at each node yield the full formatting for that node. However, the full formatting of symbols in the text is made up of the sum of the full formatting of all parent nodes of a paragraph that contains text and the symbols' own formatting.

Various embodiments of the text subsystem can serialize the object/attributes of the text tree such that, if there are several links to the same object from different parts of the document, the object will be the same as well (not just several matching features but precisely identical) after restoration from the text tree.

Additional attributes associated with the text range can be implemented using an ITextAttribute interface. Implementation of this interface makes it possible for the object of the attribute to control its own behavior when the text is modified, such as by inserting or transferring attributes using patterns. For example, when an attribute is inserted in the text, the IsEqual method can be called up along with the attribute for it with the same name in the text subsystem. If the method returns true, it is considered that the exact same attribute as is currently in the text has been inserted and it is precisely the one that will be inserted in the range in question. This allows objects to be inserted with the same name from the clipboard along with those already in the text. For example, attributes associated with text attributes can be combined. As a specific example, two tags that span ranges of characters can set the color of text within its respective range. When the ranges of the characters are next to one another, these two tags can be combined into a single tag that covers the combined ranges of the original tags. Not all tags, however, can be combined. For example, tags associated with images cannot be combined since two pictures cannot be combined even if they are next to one another.

In addition, ITextAttribute allows for determining the behavior of the attribute during replacement operations. In this case, if there are attributes with the same name but different values in the replaced range, the text subsystem queries the attribute that falls within the changed text by calling the ITextAttribute::GetReplaceValue virtual method. When they are copied, attributes with the same name may be consolidated.

Figure 2:
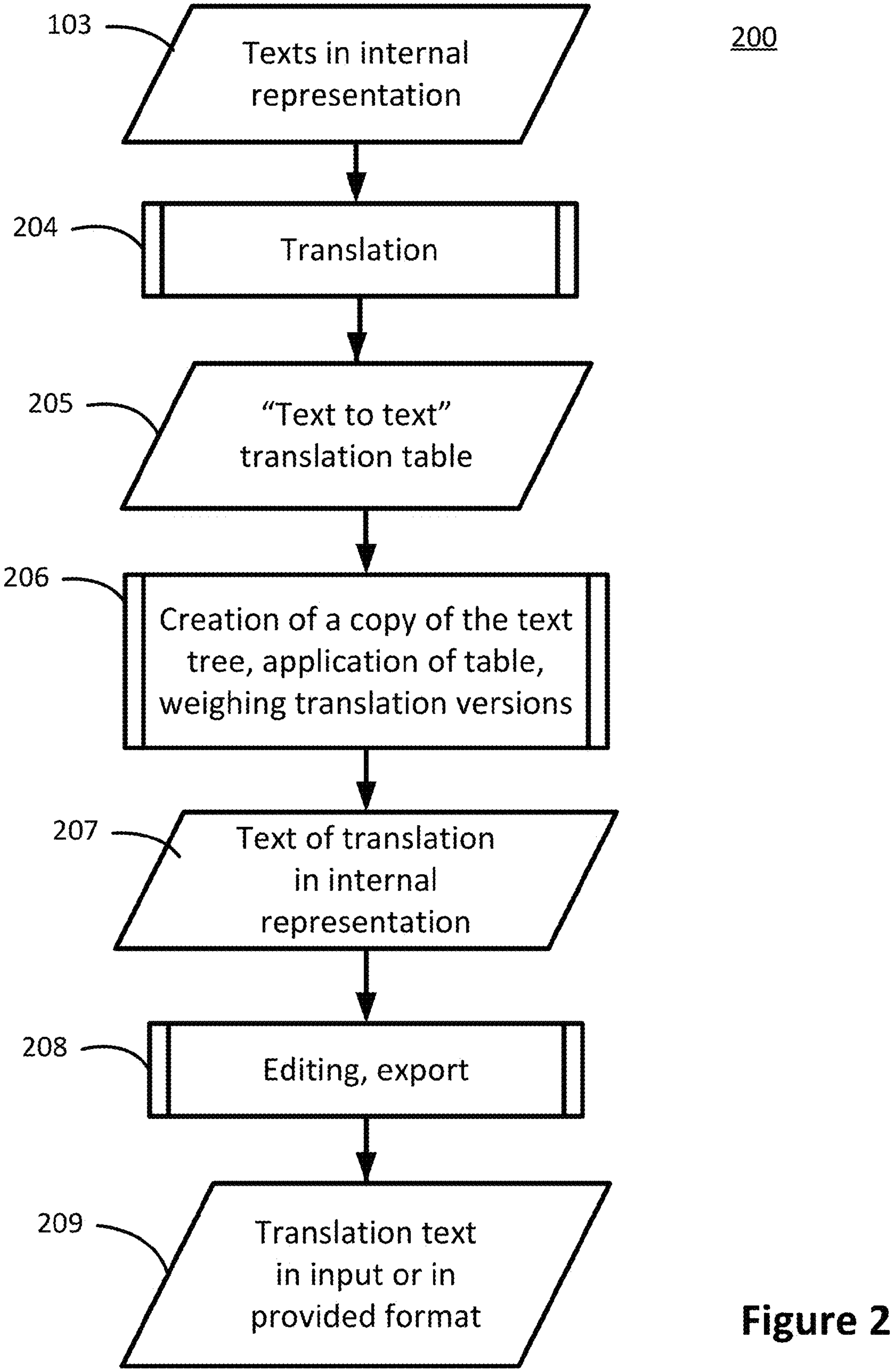
FIG. 2 illustrates a flow diagram of operations performing further actions using the text representation of the document in accordance with one embodiment.

In addition, the document can be modified, whereby all the attributes and properties of the document are preserved in the resulting document. The production of a universal representation of a text document (e.g., 103 in FIG. 1) may be a starting point for multiple scenarios for working with the document. FIG. 2 illustrates a flow diagram of a method performing further actions using the text representation of the document in accordance with one embodiment when the document should be modified, for example, translated to another language.

For example, copies of the document may be created, part of the document may be extracted into a separate document, several documents may be "pasted" into one, or part of one document may be "pasted" into another as a cut-out, footnote, comment or other. In one embodiment, a document can be translated into another language using a machine-translation system or manually. When this is done, it is necessary for the document in the other language to have similar or the same formatting as the source document, e.g., with the same attributes, styles, formatting, links and hyperlinks.

Returning to FIG. 2, the document translation occurs at step 204. Any machine translation system that returns, together with the translation, a table of correspondence between the words translated may be used for the translation. Because the text blocks and text ranges are elements of the tree, they can separate into blocks of the text tree and can be examined independently of each other. In other embodiments, the entire text of the document can be examined.

In addition, because a machine translation system may recommend various translations for a word or text range if certain user modes are chosen, it may be proposed to create a text→text translation table (205) that includes one or more versions of the translation for the fragments (and the words) of the source text. The text→text translation table (205) can also be a starting point for different scenarios for working further with the document.

To produce a document with a translation to another language, a copy of the text tree is produced at stage 206 and the text→text translation table (205) is applied to the tree nodes. FIG. 6 shows an example of a text→text translation table for a paragraph that starts with the phrase "The errata are numbered, classified as substantive or editorial and listed in reverse chronological order of their date of publication in each category." The left column of the table lists the words of the source text in the source language, while the second column provides a range of symbols used in this word. The right column contains the word in the target language that needs to replace it and be inserted instead of the indicated range of symbols. Some words in the source (English) language, such as articles (601), have no counterpart in the target (Russian) language. The preposition "of" (603) is also often not reflected in the translation of the sentence, so nothing is included in the places for such words and the right column for them remains empty. If the order of words changes during translation, a link is added to the range of symbols that replaces this word. The attributes and the data for the replaced word are transferred to the word in the target language that replaces it. For example, if the word "errata" (605) was italicized in this sentence of the source document, the word corresponding to it in the translation, "ошибки" (606), will also have this attribute. This ensures that the translated version of the document will have formatting that resembles or is the same as that of the source document.

The internal representation (207) of the new document as a text tree may also be a starting point for different scenarios for working further with the document. To produce a document with a translation without user involvement in automated mode, words in the new language can be selected that correspond with words and/or phrases in the source language. It is possible that some words and/or phrases in the source language can be translated into different words and/or phrases in the new language. Depending on items such as the context of the sentence, certain words and/or phrases will provide for a better translation. Each variant translation can have a score that reflects the perceived correctness of the translation. The variant translation with the best score can be chosen for each word and/or phrase of the text.

In another embodiment, the user has the opportunity to select interactively a suitable variant translation from among several possibilities for the individual words and/or phrases. In addition, the user may manually change the style or formatting or may perform other operations to edit the document such as combining or splitting paragraphs, changing the numbering of parts of the text, refreshing the page numbering, redoing or adding headings, and so forth. A "final" document with a translation into another language in the same format with the same layout as the source can be generated. For this final document, all of the attributes of the source text tree are transferred to the text tree for the new document.

The attribute transfer between different documents can be difficult. For example, if the source document has bold or italic text, then the corresponding fragment in the translation text should be marked with this attribute to preserve formatting. The objects associated with the text (such as links, hyperlinks, comments, etc.) are transferred to the new document. However, an attribute pattern can only be used within one document, so first a copy of the source document (206) is made with attributes, and then the translation is done within this copy.

Working with unique attributes has some special features. Since these attributes cannot be located within more than one uninterrupted text range, an attribute pattern cannot be used until the old attributes are removed. Otherwise, the attributes are not used. Hence one can first formulate a pattern and find the translation of the necessary piece of text. After that, the old text can be removed with its attributes, and then the translation must be inserted and its attributes changed accordingly. For example, the inserted attributes can be changed based upon the removed attributes.

In yet another embodiment, the text subsystem includes support for bilingual text. Bilingual text includes two different documents and provides a connection between parts of different documents. A parallel fragment can be used as the connecting mechanism. A parallel fragment is an object that ties the corresponding text in both documents. All of the fragments can be in linear order. Thus, the source documents can be seen as two text streams running in parallel, split into sequential paired pieces. For any fragment, one can ask for the fragments before and after it. In addition, parallel fragments can be used to indicate the fragments in one document that correspond to fragments in the second document.

The bilingual document can be a data structure that stores two unilingual documents and provides access to the fragments. The fragments in turn are tied to the text representation by objects that store attributes and data that mark pieces of text. Marking proceeds by creation of an initial fragment of the tree that covers the unilingual documents. Then this fragment can be broken down into smaller ones. When the document is created, it is initialized with empty documents and marked. When a bilingual document is serialized, the attributes common to both texts are serialized as one attribute. That is so that there is a sole instance in both texts when it is restored.

Figure 7:
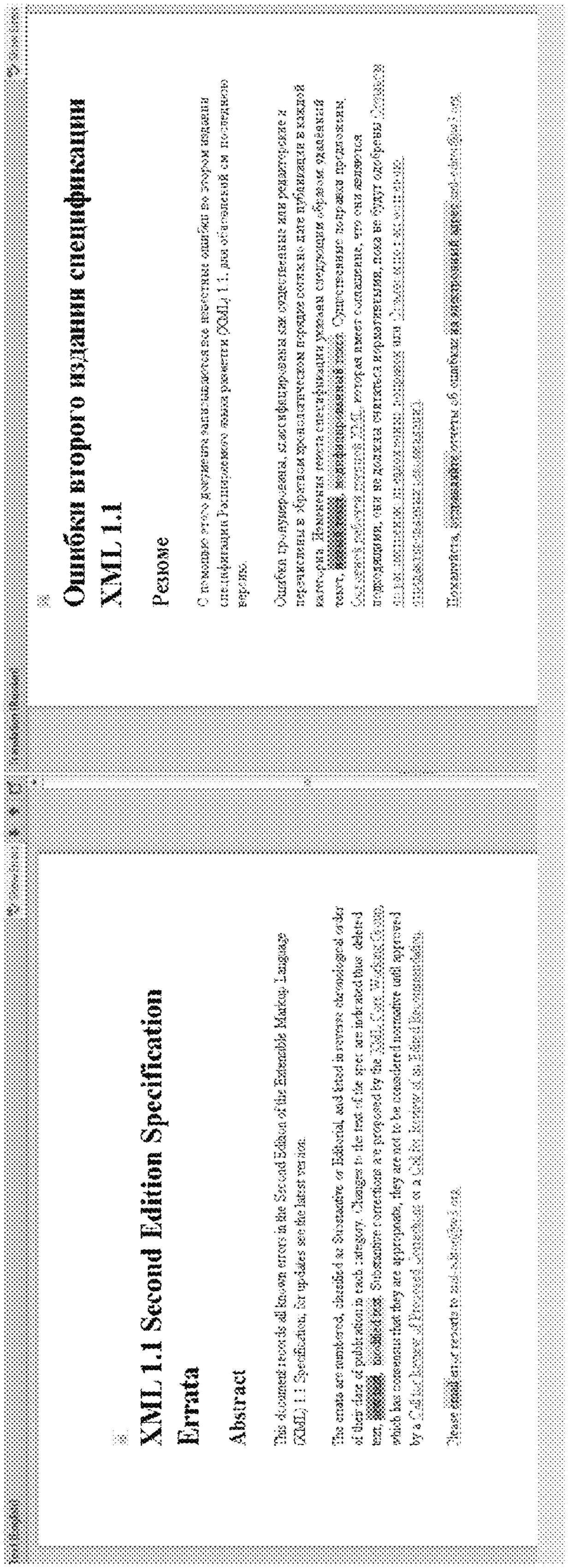
FIG. 7 illustrates an example of a text subsystem interface that allows the user to see the source text and the text of the translation into a different language in two windows opened in parallel in accordance with one embodiment.

The text subsystem can have an editor interface that allows the user to see the source text and the text of the translation to a different language, in two windows opened in parallel. An example of such an interface is shown in FIG. 7. Returning to the block chart shown in FIG. 2, the translation may be edited at stage 208.

Figure 8:
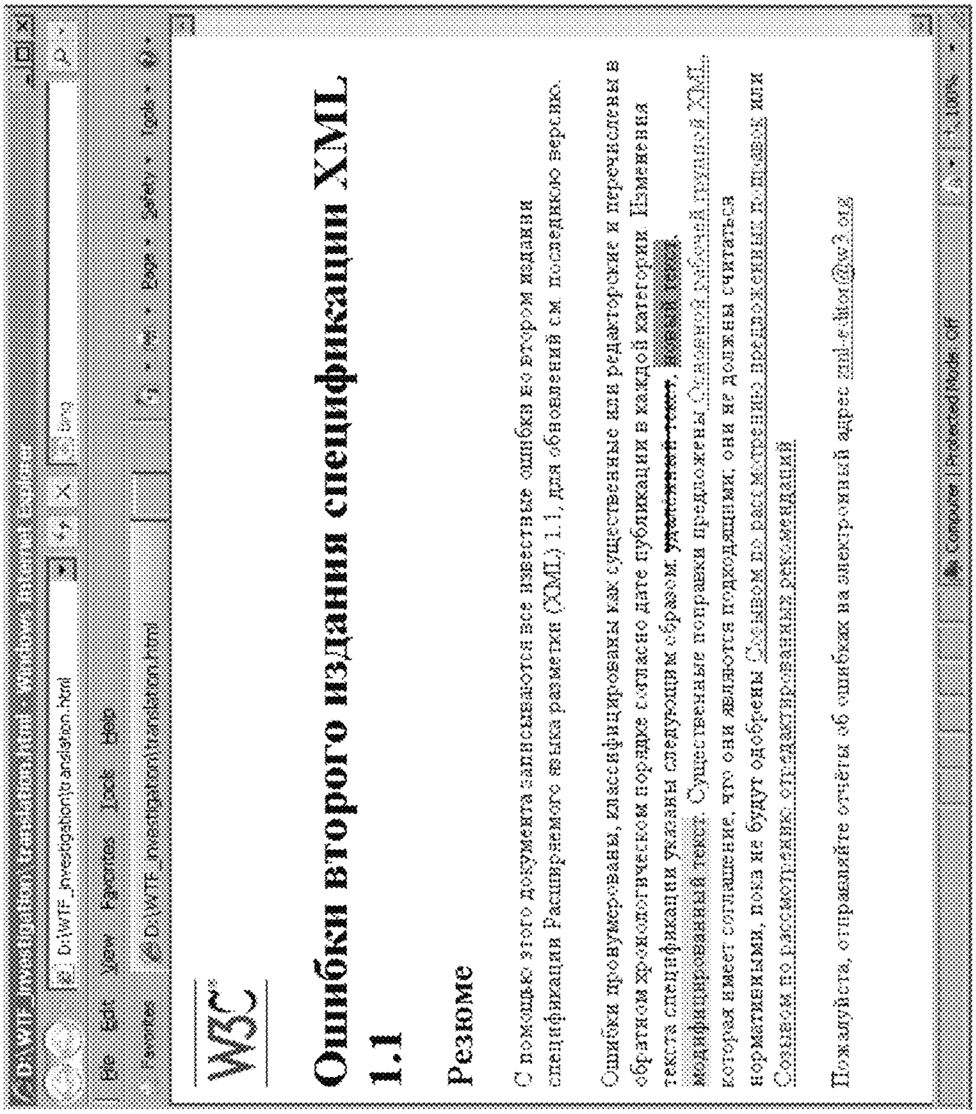
FIG. 8 shows an example of translation of the source document provided in FIG. 3A, exported to Internet Explorer in exactly the same format as the source in accordance with one embodiment.

The new document can then be exported into the source format or another specified format (209). The translation of the source document displayed in FIG. 3 is shown in FIG. 8 in exactly the same format as the source, and its HTML code is shown in FIG. 9.

Figure 10:
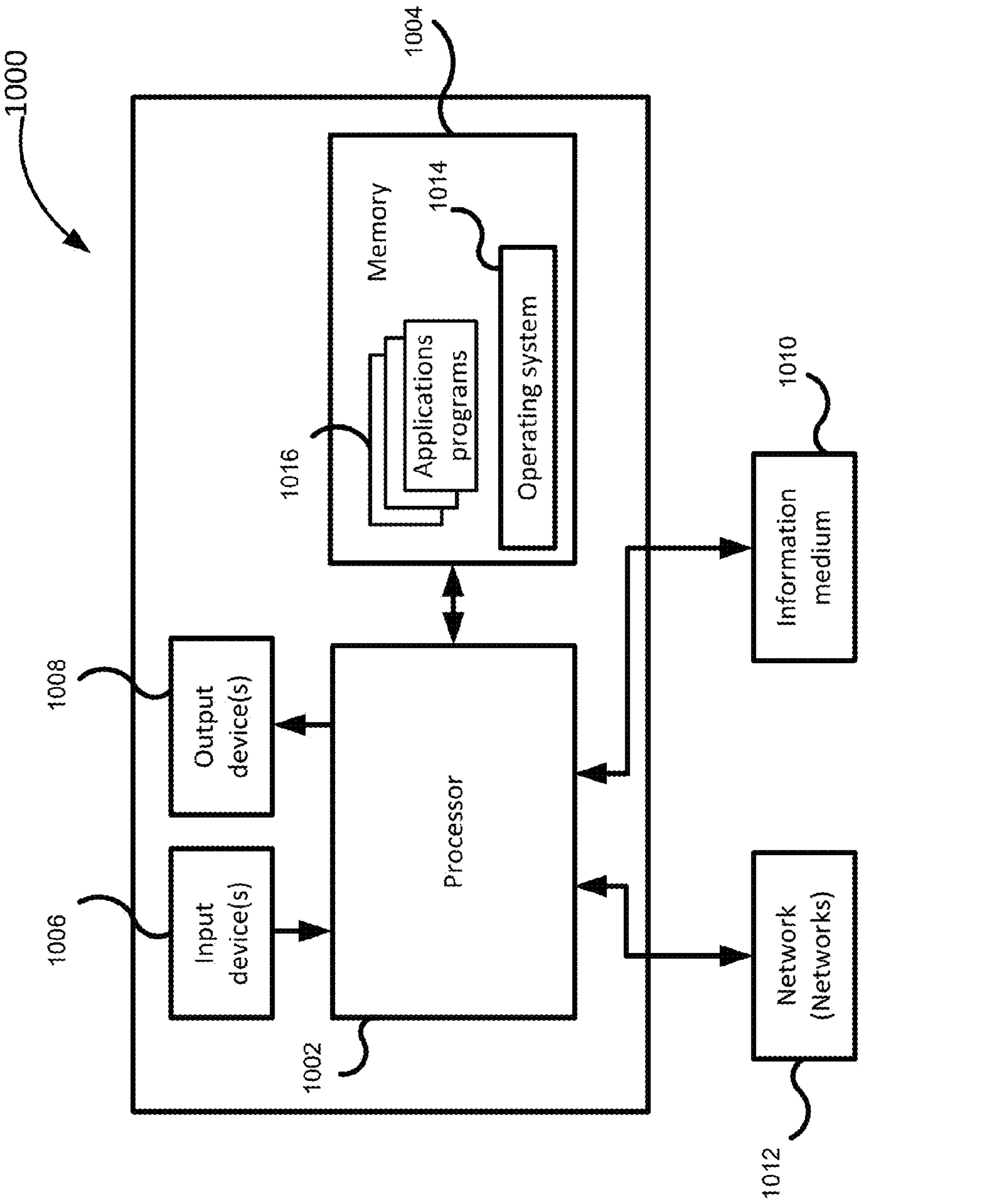
FIG. 10 shows an example of a computer platform that may be used in accordance with one embodiment.

FIG. 10 shows a possible example of a computer platform (1000) that may be used to implement the described embodiments. The computer platform (1000) includes at least one processor (1002) connected to a memory (1004). The processor (1002) may be one or more processors and may contain one, two or more computer cores. The memory (1004) may be RAM and may also contain any other types or kinds of memory, particularly non-volatile memory devices (such as flash drives) or permanent storage devices such as hard drives and so forth. In addition, an arrangement can be considered in which the memory (1004) includes information-storage media physically located elsewhere within the computer facilities (1000) such as cache memory in the processor (1002), and memory used as virtual and stored on external or internal permanent storage (1010).

The computer platform (1000) also usually has a certain number of input and output ports to transfer information out and receive information. For interaction with a user, the computer platform (1000) may contain one or more input devices (such as a keyboard, a mouse, a scanner, and other) and a display device (1008) (such as a liquid crystal display). The computer facilities (1000) may also have one or more permanent storage devices (1010) such as an optical disk drive (CD, DVD, or other), a hard disk, or a tape drive. In addition, the computer facilities (1000) may have an interface with one or more networks (1012) that provide connections with other networks and computer equipment. In particular, this may be a local area network (LAN), a wireless Wi-Fi network and may or may not be joined to the World Wide Web (Internet). It is understood that the computer facilities (1000) include appropriate analog and/or digital interfaces between the processor (1002) and each of the components (1004, 1006, 1008, 1010 and 1012).

The computer facilities (1000) are managed by the operating system (1014) and include various applications, components, programs, objects, modules and other, designated by the consolidated number 1016.

Overall, the programs used to implement disclosed embodiments may be a part of an operating system or may be a specialized application, component, program, dynamic library, module, script, or a combination thereof.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of a class of technical tasks they can solve, not simply as a technical implementation on some base of elements.

What is claimed is:

1. A method comprising:

receiving a document in a first format, wherein the document comprises a text supported non-text data, and unsupported non-text data;

creating, using a first filter associated with the first format, a universal text representation of the document, wherein the universal text representation presents the text and the supported non-text data, wherein the universal text representation preserves the unsupported non-text data by storing an association of the unsupported non-text data with supported data from the document, wherein the universal text representation comprises a text tree, wherein the text tree comprises nodes that comprise one or more words and locations of the words, and wherein one or more of the nodes comprise attributes associated with formatting of the words;

modifying the universal text representation based upon input from a user of a program in a what you see is what you get (WYSIWYG) mode, wherein a location of where the supported data and the unsupported non-text data are kept is presented to the user, wherein modifying the universal text representation comprises translating the text presented in the universal text representation from a first language to a second language, wherein the first language is different than the second language, and wherein translating the text comprises:

receiving a translation table representing the text in the second language, wherein the translation table comprises a correspondence between the words in the first language and translated words in the second language;

creating a copy of the text tree, wherein the copy of the text tree preserves the formatting of the words; and for each node among the nodes in the copy of the text tree, replacing the words in the first language with the translated words based upon the translation table; and exporting, by at least one processor, the modified universal text representation using a second filter associated with a second format, wherein the supported data and the unsupported non-text data are exported.

2. The method of claim 1, further comprising:

determining that text ranges of two of the attributes of a node among the nodes are next to one another;

determining that the two attributes can be combined; and combining the two attributes into a single attribute that covers the text ranges of the two attributes.

3. The method of claim 1, wherein the first format is the same as the second format, and wherein the first filter is the same as the second filter.

4. The method of claim 1, wherein the first format is different from the second format, and wherein the first filter is different from the second filter.

5. The method of claim 4, wherein the second filter exports all of the supported data.

6. The method of claim 1, wherein the association of the unsupported non-text data with the supported data comprises a description of a desired behavior of the unsupported non-text data.

7. The method of claim 1, further comprising:

receiving edits to translations in the translation table; and updating the copy of the text tree based upon the edits.

8. The method of claim 1, further comprising creating parallel fragments between the text tree and the copy of the text tree representing the text in the text tree that corresponds with the text in the copy of the text tree.

9. The method of claim 8, further comprising:

displaying the text in the first language of the text tree; and displaying simultaneously the text in the second language of the copy of the text tree.

10. A system comprising:

at least one memory that stores instructions; and one or more processors configured to execute the instructions to:

receive a document in a first format, wherein the document comprises a text, supported non-text data, and unsupported non-text data;

create, using a first filter associated with the first format, a universal text representation of the document, wherein the universal text representation presents the text and the supported non-text data, wherein the universal text representation preserves the unsupported non-text data by storage of an association of the unsupported non-text data with supported data from the document, wherein the universal text representation comprises a text tree, wherein the text tree comprises nodes that comprise one or more words and locations of the words, and wherein one or more of the nodes comprise attributes associated with formatting of the words;

modify the universal text representation based upon input from a user of a program in a what you see is what you get (WYSIWYG) mode, wherein a location of where the supported data and the unsupported non-text data are kept is presented to the user, wherein, to modify the universal text representation, the processors are further configured to execute the instructions to translate the text presented in the universal text representation from a first language to a second language, wherein the first language is different than the second language, and wherein, to translate the text, the processors are further configured to execute the instructions to:

receive a translation table representing the text in the second language, wherein the translation table comprises a correspondence between the words in the first language and translated words in the second language;

create a copy of the text tree, wherein the copy of the text tree preserves the formatting of the words; and for each node among the nodes in the copy of the text tree, replace the words in the first language with the translated words based upon the translation table; and export the modified universal text representation using a second filter associated with a second format, wherein the supported data and the unsupported non-text data are exported.

11. The system of claim 10, wherein the processors are further configured to execute the instructions to:

determine that text ranges of two of the attributes of a node among the nodes are next to one another;

determine that the two attributes can be combined; and combine the two attributes into a single attribute that covers the text ranges of the two attributes.

12. The system of claim 10, wherein the association of the unsupported non-text data with the supported data comprises a description of a desired behavior of the unsupported non-text data.

13. The system of claim 10, wherein the processors are further to execute the instructions to:

receive edits to translations in the translation table; and update the copy of the text tree based upon the edits.

14. The system of claim 10, wherein the processors are further to execute the instructions to:

create parallel fragments between the text tree and the copy of the text tree representing the text in the text tree that corresponds with the text in the copy of the text tree;

display the text in the first language of the text tree; and display simultaneously the text in the second language of the copy of the text tree.

15. A non-transitory computer-readable medium having instructions stored thereon, that when executed by at least one processor, cause the processor to:

receive a document in a first format, wherein the document comprises a text, supported non-text data, and unsupported non-text data;

create, using a first filter associated with the first format, a universal text representation of the document, wherein the universal text representation presents the text and the supported non-text data, wherein the universal text representation preserves the unsupported non-text data by storage of an association of the unsupported non-text data with supported data from the document, wherein the universal text representation comprises a text tree, wherein the text tree comprises nodes that comprise one or more words and locations of the words, and wherein one or more of the nodes comprise attributes associated with formatting of the words;

modify the universal text representation based upon input from a user of a program in a what you see is what you get (WYSIWYG) mode, wherein a location of where the supported data and the unsupported non-text data are kept is presented to the user, wherein, to modify the universal text representation, the instructions are further to cause the processor to translate the text presented in the universal text representation from a first language to a second language, wherein the first language is different than the second language, and wherein, to translate the text, the instructions are further to cause the processor to:

receive a translation table representing the text in the second language, wherein the translation table comprises a correspondence between the words in the first language and translated words in the second language;

create a copy of the text tree, wherein the copy of the text tree preserves the formatting of the words; and for each node among the nodes in the copy of the text tree, replace the words in the first language with the translated words based upon the translation table; and export, by the processor, the modified universal text representation using a second filter associated with a second format, wherein the supported data and the unsupported non-text data are exported.

16. The non-transitory computer-readable medium of claim 15, wherein the instructions are further to cause the processor to:

determine that text ranges of two of the attributes of a node among the nodes are next to one another;

determine that the two attributes can be combined; and combine the two attributes into a single attribute that covers the text ranges of the two attributes.

17. The non-transitory computer-readable medium of claim 15, wherein the association of the unsupported non-text data with the supported data comprises a description of a desired behavior of the unsupported non-text data.

18. The non-transitory computer-readable medium of claim 15, wherein the instructions are further to cause the processor to:

receive edits to translations in the translation table; and update the copy of the text tree based upon the edits.

19. The non-transitory computer-readable medium of claim 15, wherein the instructions are further to cause the processor to:

create parallel fragments between the text tree and the copy of the text tree representing the text in the text tree that corresponds with the text in the copy of the text tree;

display the text in the first language of the text tree; and display simultaneously the text in the second language of the copy of the text tree.

* * * * *